HENRY J. KOZICKI
*INVENTOR.*

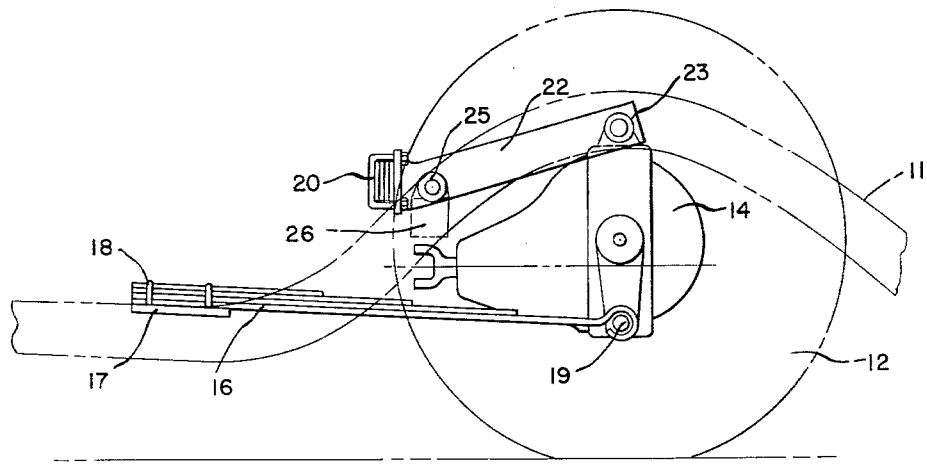
FIG. 2
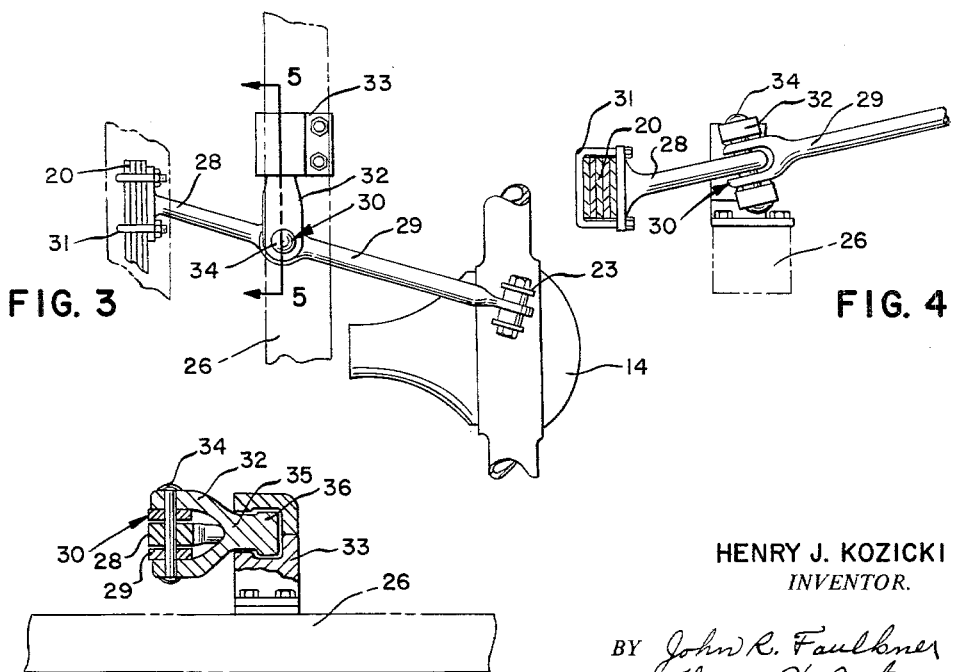
FIG. 3  FIG. 4
FIG. 5
HENRY J. KOZICKI
*INVENTOR.*
BY John R. Faulkner
Thomas H. Oster
ATTORNEYS

HENRY J. KOZICKI
*INVENTOR.*

BY John R. Faulkner
Thomas H. Oster

ATTORNEYS

HENRY J. KOZICKI
*INVENTOR.*

BY John R. Faulkner
Thomas H. Oster

ATTORNEYS

HENRY J. KOZICKI
*INVENTOR.*

BY John R. Faulkner
Thomas H. Oster

ATTORNEYS

United States Patent Office 3,228,489
Patented Jan. 11, 1966

3,228,489
MOTOR VEHICLE ROAD WHEEL SUSPENSION WITH HEIGHT ADJUSTING MEANS TO COMPENSATE FOR LOAD CHANGES
Henry J. Kozicki, Livonia, Mich., assignor to Ford Motor Company, Dearborn, Mich., a corporation of Delaware
Filed July 15, 1960, Ser. No. 43,029
5 Claims. (Cl. 180—73)

This invention relates generally to a motor vehicle wheel suspension and particularly to a suspension system for the rear wheels. The present invention is particularly adapted to provide a suspension system with a low wheel rate and also to provide a means for adjusting the riding height of a motor vehicle to compensate for load changes.

The suspension system of this invention utilizes a pair of longitudinally extending cantilever springs, each having one end mounted to a frame of a motor vehicle. The other end of each leaf spring is articulated to the rear axle of the vehicle inboard from the rear road wheels. A torsion leaf spring, which has one end mounted to a side frame rail of the vehicle, extends transversely beyond the longitudinal axis of the vehicle. The differential carrier housing of the rear axle is connected to the transversely extending torsion leaf spring by a longitudinal link which is pivotally connected to a frame crossmember immediate the carrier housing and the torsion spring.

In another embodiment of this invention, a longitudinally extending power strut of standard design, comprising a cylinder and a piston, is attached to a transversely extending torsion leaf spring which is pivotally connected to a side frame rail at one of its ends. The power strut furnishes the necessary force through a lever to wind or to unwind the torsion leaf spring to compensate for changes in the load of the vehicle.

A further embodiment of this invention relates to the adaptation of the suspension system of this invention to a subframe by mounting the spring member on the subframe instead of on the frame of the vehicle proper. By isolating the subframe from the vehicle frame by rubber isolation mounts, the transmission of road noise and harshness into the vehicle body is reduced to a minimum.

An object of this invention is to provide a suspension system for the rear wheels which has inherent low wheel rates resulting in soft riding qualities for the motor vehicle. Also, the suspension system of this invention assists in stabilizing the vehicle body when the vehicle is being cornered.

Another object of this invention is to provide an inexpensive automatic means which makes it possible to compensate for changes in load and to effectively maintain the riding height of the vehicle within the range capacity of the spring members of the vehicle suspension.

Other objects and advantages of this invention will become more apparent from the following description when viewed in connection with the accompanying drawings in which:

FIGURE 2 is a side elevational view of the rear suspension members shown in FIGURE 1;

FIGURE 3 is a partial plan view of an alternative construction of the link member of the embodiment of this invention shown in FIGURE 1;

FIGURE 4 is a partial side elevational view of FIGURE 3;

FIGURE 5 is a cross-sectional view taken at line 5—5 of FIGURE 3;

It is to be understood that the term "frame" as used in the specification and in the claims will refer to either a conventional vehicle frame or a conventional unitary frame and body construction.

Figure 1:
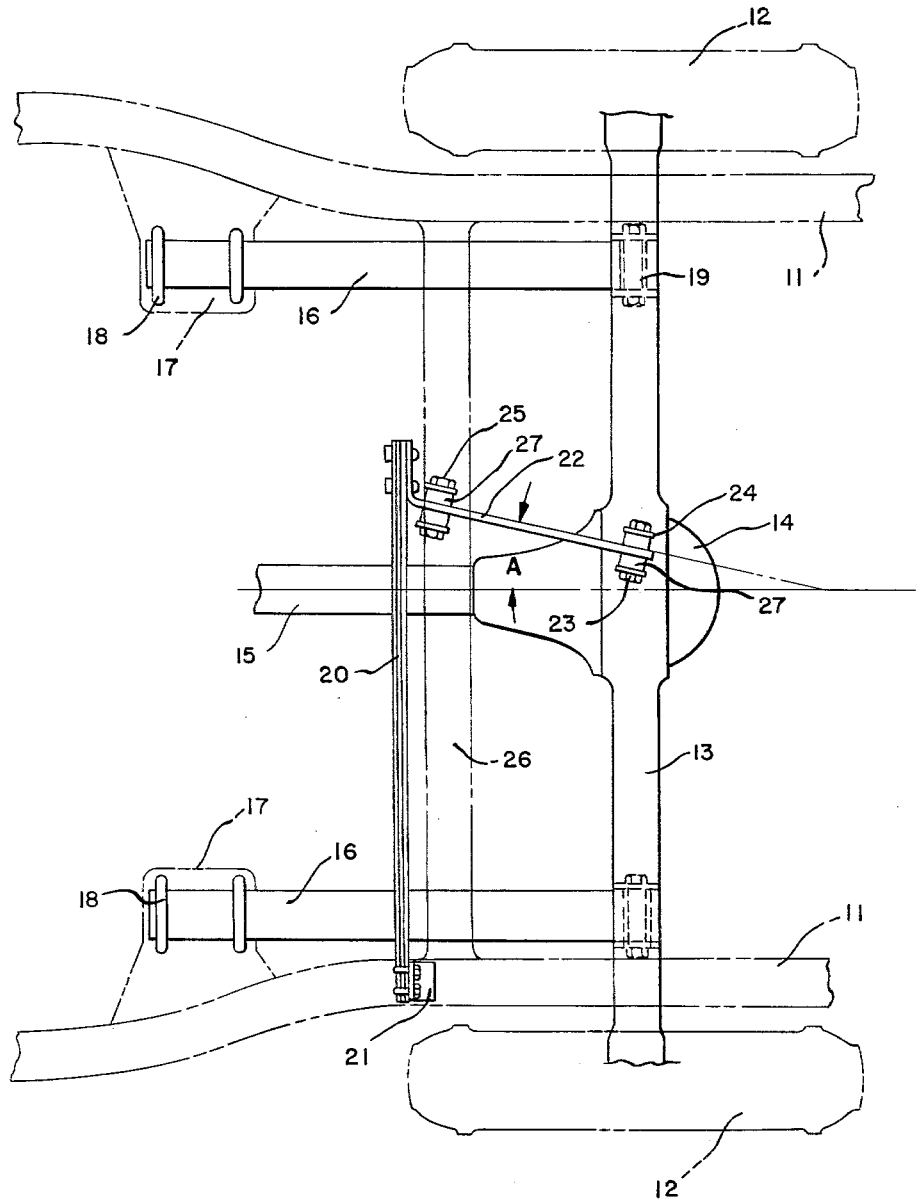
FIGURE 1 is a plan view of a portion of a motor vehicle chassis depicting the rear suspension members of this invention.

In FIGURE 1 are seen side frame rails 11 of a motor vehicle frame. Rear road wheels 12 are disposed at opposite ends of the rear axle 13. A differential carrier housing 14, which is in the center of the rear axle 13, is connected to a drive shaft 15. A pair of generally longitudinally extending cantilever leaf springs 16 having their main cross-sectional dimensions disposed horizontally are attached to a frame bracket 17 by U-bolts 18. The frame bracket 17 is secured to the inboard side of the side frame rails 11. The cantilevered end of each of the leaf springs 16 makes an articulated connection 19 with the rear axle 13 intermediate the road wheels 12 and the differential carrier housing 14.

A generally transversely extending torsion leaf spring 20 having its main cross-sectional dimensions disposed vertically has one end attached to a second frame bracket 21 which is secured to one of the side frame rails 11. The torsion leaf spring 20 extends inboard of said vehicle beyond its longitudinal axis with its inboard end attached to a link 22. The link 22 extends generally longitudinally and rearwardly from the torsion leaf spring 20 forming an acute angle "A" with the longitudinal axis of the vehicle, as seen in FIGURE 1. The link 22, which flexes laterally extends upwardly to make a pivotal connection 23 with a bracket 24 attached to the top of the periphery of the differential carrier housing 14, best seen in side-elevation in FIGURE 2.

A connection 25 pivotally connects the link 22 to a cross-frame member 26 intermediate the differential carrier housing 14 and the torsion leaf spring 20. The pivotal connections 23 and 25 at the bracket 24 and at the cross-frame member 26, respectively, are journaled in elastic bushings 27 to reduce the transmission of vibration from the rear road wheels 12 into the vehicle body.

The link 22 is shown as a flexible leaf spring which acts as the upper control arm for the rear suspension system of the motor vehicle. The rear end weight of the unsprung portion of the vehicle which is not assumed by the cantilever springs 16 is carried by the transversely extending torsion leaf spring 20 through the link 22. Also, the torsion leaf spring 20 acts as an auxiliary spring supplementing the cantilever leaf springs 16 in jounce and rebound motion of the rear road wheels 12. The link 22 together with cantilever springs 16 control the path of the differential carrier housing 14 and reduce the vertical movement of the pinion shaft and the universal joint to permit a lower floor in the motor vehicle.

The cantilever springs 16 act as lower trailing arms of the suspension system during wheel movement. The utilization of a flexible single leaf spring for the link 22 permits the movement of a pivotal connection 23 at the top of the differential carrier housing 14 to move laterally with respect to the pivotal connection 25 at the cross-frame member 26. The ends of the rear axle 13 are restrained laterally by the articulated connection 19 resulting in the stabilization of the vehicle body in roll when the vehicle is being cornered.

The placing of the link 22 at an acute angle "A" with the longitudinal axis of the vehicle brings about an anti-roll torque to counter the engine torque that causes roll on wide open, sudden starts with the resultant effect on the steering of the vehicle which currently requires driver correction.

In FIGURES 3, 4 and 5 is seen another embodiment of this invention depicting a different construction of the link 22 as seen in FIGURES 1 and 2. The link structure comprises two arms, a rigid arm 28 and a rotating arm 29, with one end of each arm interconnected to form a vertical pivotal joint 30. The other end of the rigid arm 28 is attached to the torsion leaf spring 20 by U-bolts 31, while the other end of the rotating arm 29 connects to the bracket 24 attached to the top of the periphery of the differential carrier housing 14. The vertical pivotal joint 30 is fastened to a yoke 32 which pivots in a two-piece bracket 33 attached to the cross-frame member 26. The vertical pivotal joint 30 is held in the yoke 32 by a pin 34 to permit the movement of the pivotal connection 23 at the differential carrier housing 14 in a lateral direction in relation to the vertical pivotal joint 30. In a vertical plane, the rigid arm 28, the vertical pivotal joint 30 and the rotating arm 29 will act as a continuous rigid member which pivots in a two-piece bracket 33, best seen in FIGURE 4.

In FIGURE 5 is seen a partial cross-section of the two-piece bracket 33 which illustrates one method for pivoting the interconnected arms 28 and 29 of the link at the vertical pivotal joint 30. The yoke 32 is provided with a shoulder 35 with a flange 36 at one end which is seated and retained in the two-piece bracket 33 upon assembly of the bracket members.

The link structure, comprising the interconnected rigid arm and rotating arm, is rigid in a vertical plane and will support a proportionate share of the unsprung portion of the vehicle. The replacement of the flexible link with the interconnected rigid arms improves the durability of the suspension system of this invention.

Figure 6:
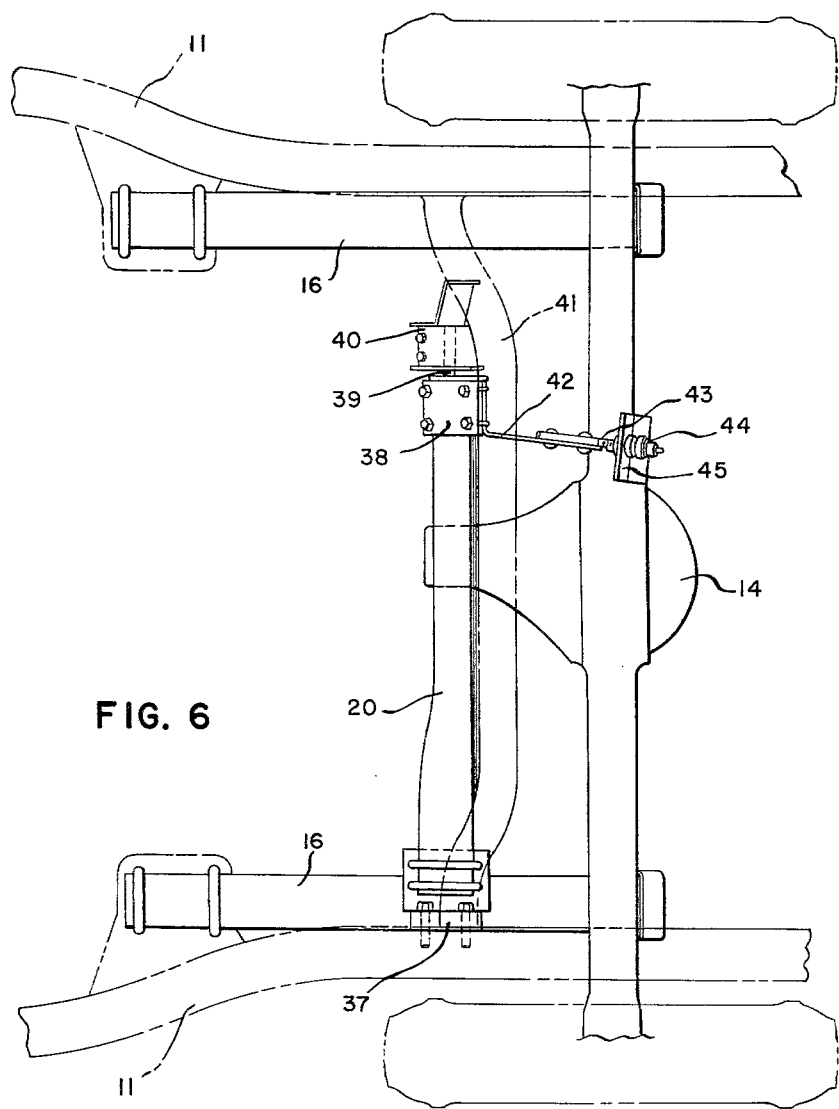
FIGURE 6 is a plan view of a portion of a motor vehicle chassis depicting another embodiment of this invention which utilizes a torsion spring member installed in a twisted position to preload the suspension system.
Figure 7:
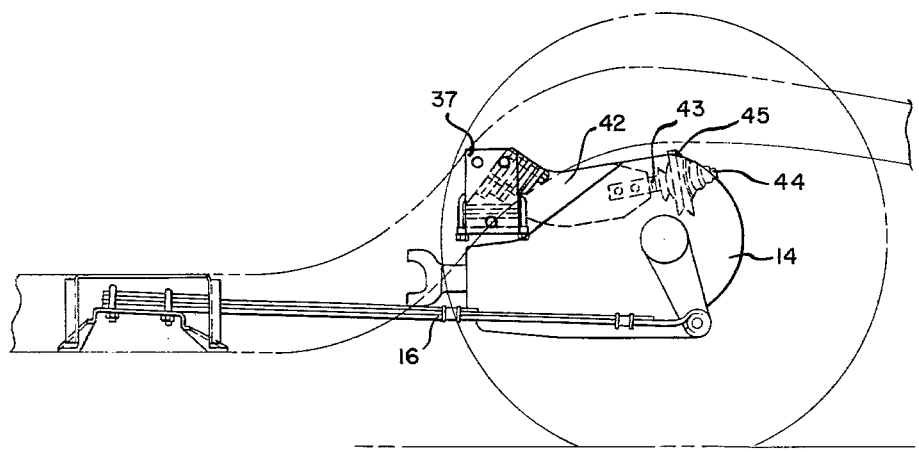
FIGURE 7 is a side elevational view of FIGURE 6.
Figure 8:
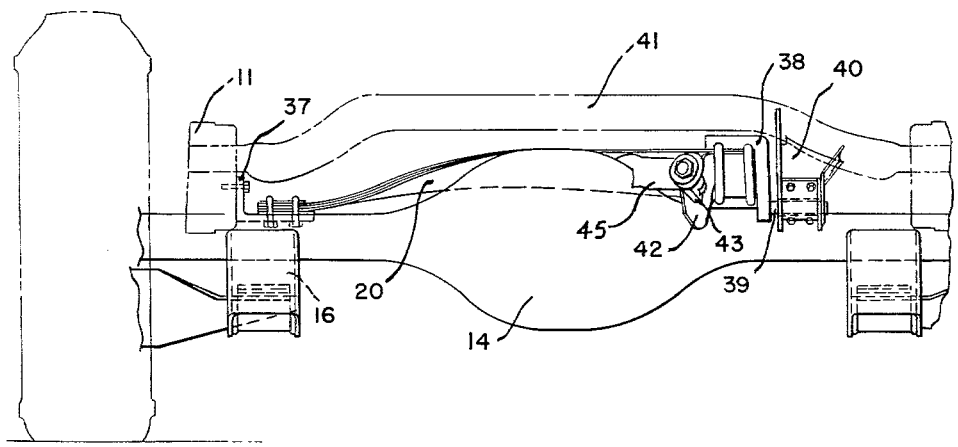
FIGURE 8 is a partial elevation of the embodiment shown in FIGURE 6.

In FIGURES 6, 7 and 8 is seen a plan view of another embodiment of this invention in which the transversely extending torsion leaf spring 20 of FIGURE 1 is installed under load. The torsion leaf spring 20 with its main cross-sectional dimension horizontally is secured to the side frame rail 11 by L-shaped bracket 37. The transversely extending inboard end of the torsion leaf spring 20 is twisted along its longitudinal axis in a clockwise direction when facing the inboard end of the leaf spring 20. A bracket 38, which attaches to the inboard end of the twisted torsion leaf spring 20, has a pivot shaft 39 journaled in a frame bracket 40. The frame bracket 40 is secured to a cross-frame member 41. An L-shaped link 42 is attached to the bracket 38 while the inboard end of the torsion leaf spring 20 is maintained in its twisted position. The longer leg of the link 42 which flexes laterally, extends generally longitudinally to connect with a threaded member 43. A nut 44 secures the threaded member 43 to a bracket 45 which is mounted on top of the periphery of the differential carrier housing 14, best seen in FIGURE 8.

This embodiment of the invention is a modification of the suspension system shown in FIGURES 1 and 2 which permits the preloading of the torsion leaf spring to the desired wheel rate for a given wheel load. The transversely extending end of the twisted torsion leaf spring 20 is connected to the differential carrier housing 14 by the link 42 which exerts a downward moment on the differential carrier housing 14 to resist the jounce motion of the road wheels 12. Also, by varying the thickness and number of leaves of the torsion leaf spring 20 and of the longitudinal leaf springs 16, the required wheel rate can be preselected for a given vehicle utilization.

The suspension system of this invention readily adapts itself to an adjustment of wheel rates by automatic or manual means. This can be accomplished by the utilization of an auxiliary power means in combination with a transversely extending torsion leaf spring 20 of the embodiment of this invention as shown in FIGURES 1 and 2.

Figure 10:
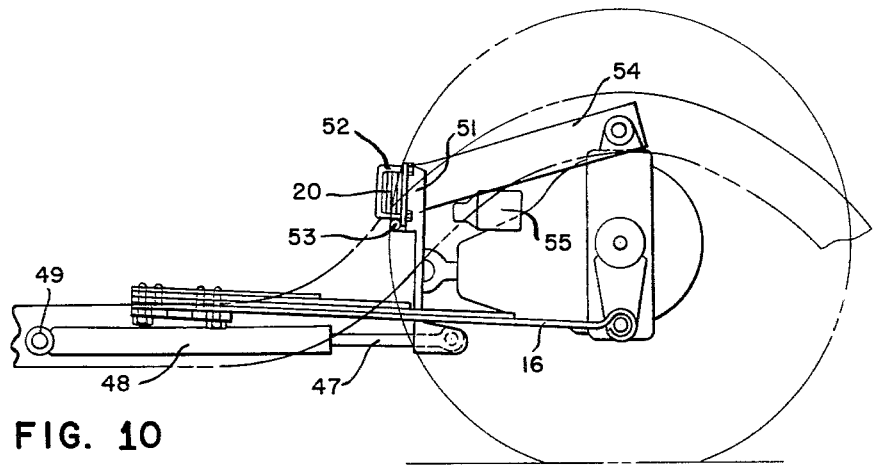
FIGURE 10 is a side elevational view of FIGURE 9.
Figure 9:
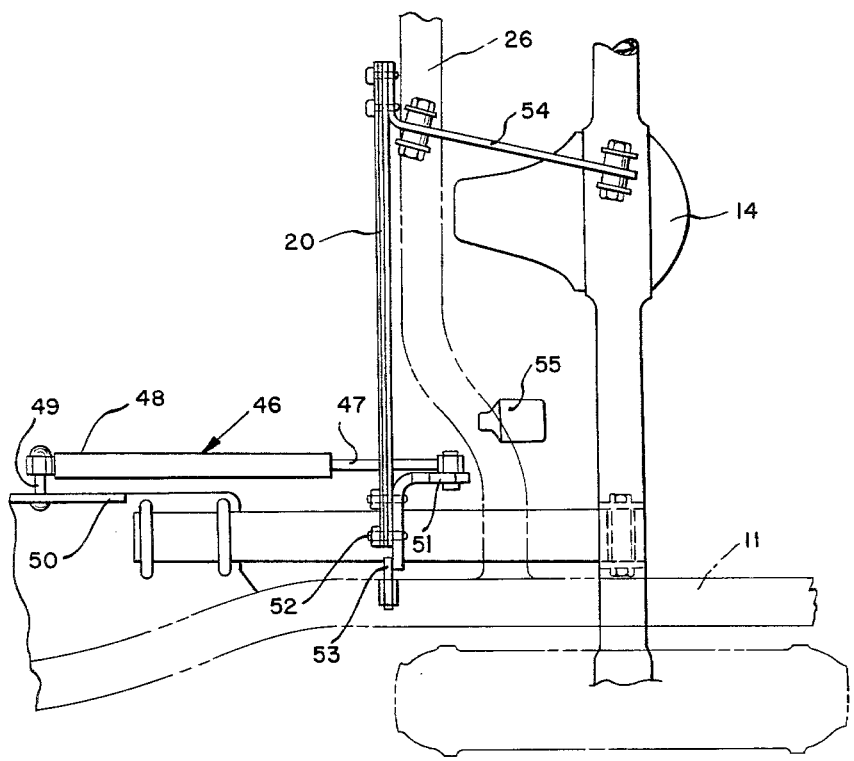
FIGURE 9 is a partial plan view of a motor vehicle chassis depicting a modified embodiment of the rear suspension members of FIGURE 1 in combination with a power strut.

A power strut 46 for instance, illustrated in FIGURES 9 and 10 is of the conventional piston 47 and cylinder 48 construction. The longitudinally extending power strut 46 is installed with one end of the cylinder 48 being journaled on a pivot pin 49 which attaches to a frame bracket 50 mounted to one of the side frame rails 11. The free end of the piston 47 of the power strut 46 is pivotally connected to a lever 51 which is secured to the torsion leaf spring 20 by U-bolts 52. The lever 51 has a transverse pin 53 which is journaled in the side frame rail 11 to permit the rotation of the torsion leaf spring 20 and its attached lever 51.

The torsion leaf spring 20 extends inboard of the vehicle to connect to one end of a link 54. The link 54, extending generally longitudinally and rearwardly from said torsion spring 20, has its rearward end pivotally connected to the top of the periphery of the differential carrier housing 14. The link 54 is also pivotally connected to the cross-frame member 26 intermediate the inboard end of the torsion leaf spring 20 and the differential carrier housing 14.

The power strut 46 furnishes the necessary power to wind or unwind the torsion leaf spring 20 to compensate for vehicle height variation due to load changes. The power strut 46 can be operated by hydraulic or other means well-known in the art and may be activated automatically by a sensing valve 55 mounted on a chassis member of the vehicle or manually by a switch (not shown) operated by the driver if so desired.

Figure 11:
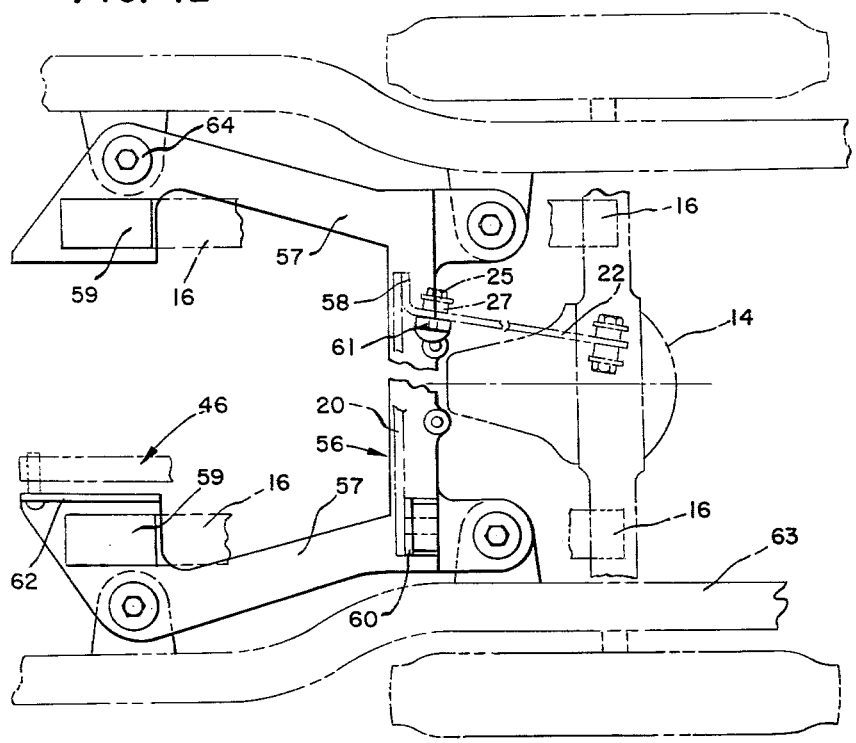
FIGURE 11 is a partial plan view of a subframe which may be utilized to mount the rear suspension members of the invention as depicted in FIGURE 1.

A further aspect of the suspension system of this invention is its adaptability for installation on a subframe 56 in order to minimize the transmission of road noise and harshness into the vehicle body. The subframe 56, as shown in FIGURE 11, comprises two side members 57 connected to a cross-member 58 adapted to fit the suspension members of the embodiment of this invention illustrated in FIGURES 1 and 2. One end of each of the longitudinally extending cantilever springs 16 is attached to a mounting pad 59. The outboard end of the transversely extending torsion leaf spring 20 is secured to a mounting pad 60. The link 22 may be pivotally connected to a bracket 61 attached to the cross-member 58.

If a power strut 46 is installed in combination with the suspension members of this invention as shown in FIGURE 9, a flange 62 will be required to provide a means for journaling one end of the cylinder 47 of the power strut 46 in the subframe 56.

Figure 12:
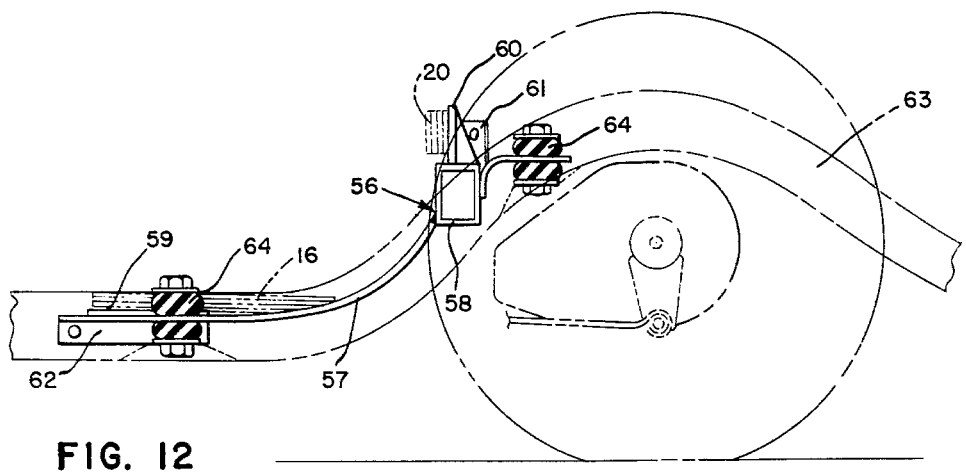
FIGURE 12 is a side elevational view of the subframe as shown in FIGURE 11.

The subframe 56 is attached as a complete unit to a frame 63 by means of isolation mounts 64 as seen in FIGURE 12. The isolation mounts 64 illustrated are well-known in the art.

It is to be understood that the subframe 56 may be mounted by any other known means which reduces the transmission of vibration from the suspension members and the subframe 56 into the vehicle body attached to the frame 63.

It will also be understood that the invention is not to be limited to the exact construction shown and described but that various changes and modifications may be made without departing from the spirit and scope of the invention as defined in the appended claims.

What is claimed as new is:

1. In a motor vehicle having a frame, an axle, road wheels disposed at opposite ends of said axle, a differential carrier disposed in the center of said axle, a pair of suspension members resiliently supporting said axle from said frame, a single laterally flexible control link extending in a generally fore-and-aft direction of said vehicle and having one end portion pivotally connected to said differential carrier and its other end portion to said frame, and a transversely extending torsion spring member longitudinally spaced from said axle and secured at one end to said frame and at its other end to said other end portion of said link.

2. In a motor vehicle having a frame, an axle, road wheels disposed at opposite ends of said axle, a differential carrier carried by said axle intermediate its ends, a pair of lower suspension members resiliently supporting said axle from said frame, a single laterally flexible control link extending in a generally fore-and-aft direction of said vehicle and having one end portion pivotally connected to the upper part of said differential carrier and its other end portion pivotally connected to said frame, and a transversely extending torsion spring member longitudinally spaced from said axle connected at one end to said frame and at its other end to said other end portion of said control link inboard of said vehicle.

3. In a motor vehicle having a frame, an axle, road wheels disposed at opposite ends of said axle, a differential carrier carried by said axle intermediate its ends, a lower suspension members resiliently supporting the ends of said axle from said frame, a single laterally flexible control link extending in a generally inclined fore-and-aft direction of said vehicle and having one end portion pivotally connected to the upper part of said differential carrier and its other end portion pivotally connected to said frame, and a transversely extending torsion spring member longitudinally spaced from said axle and secured at one end to said frame and having its other end extending beyond the center line of said vehicle, said other end of said torsion spring member being secured to the other end portion of said control link.

4. In a motor vehicle having road wheels disposed at opposite ends of an axle, load supporting spring means resiliently supporting said vehicle upon said road wheels, a torsion spring member extending generally transversely and inboard of said vehicle longitudinally spaced from said axle, said torsion spring member secured at one end to said vehicle, a single leaf spring extending generally longitudinally of said vehicle with one end of said leaf spring attached to said torsion spring member, said single leaf spring having its main cross-sectional dimension disposed vertically, and a pivotal connection between the other end of said single leaf spring and said axle, said single leaf spring also being pivotally connected to said vehicle intermediate its ends.

5. In a motor vehicle having a frame, an axle, road wheels disposed at opposite ends of said axle, a differential carrier incorporated in said axle and disposed intermediate its ends, a pair of suspension members resiliently supporting said axle from said frame, a single laterally flexible link extending in a generally fore-and-aft direction of said vehicle and pivotally connected to said differential carrier and said frame, and a torsion spring member extending inboard of said vehicle and longitudinally spaced from said axle, said torsion spring member having one end connected to said frame and having its other end connected to said link.

References Cited by the Examiner
UNITED STATES PATENTS

| | | | |
|---|---|---|---|
| 2,226,047 | 12/1940 | Borgward | 180—73 |
| 2,345,448 | 3/1944 | Best | 180—73 |
| 2,746,766 | 5/1956 | Nallinger | 280—124 |
| 2,786,670 | 3/1957 | Hammond. | |
| 2,843,397 | 7/1958 | Bastow | 280—124 |
| 3,157,242 | 11/1964 | Kozicki | 180—73 |

A. HARRY LEVY, *Primary Examiner.*

PHILIP ARNOLD, *Examiner.*